United States Patent [19]

Kunishi et al.

[11] Patent Number: 5,227,960
[45] Date of Patent: Jul. 13, 1993

[54] STACKED ELECTRIC DOUBLE LAYER CAPACITOR

[75] Inventors: Tatsuo Kunishi; Kouichi Watanabe; Masanori Endo; Masato Higuchi, all of Kyoto, Japan

[73] Assignee: Murata Manufacturing Co., Ltd., Japan

[21] Appl. No.: 931,672

[22] Filed: Aug. 18, 1992

[30] Foreign Application Priority Data

Aug. 20, 1991 [JP] Japan .................. 3-208064

[51] Int. Cl.$^5$ ............................. H01G 9/00
[52] U.S. Cl. ................................. 361/502
[58] Field of Search .................. 361/502; 29/25.03

[56] References Cited

U.S. PATENT DOCUMENTS

| | | |
|---|---|---|
| 4,709,303 | 11/1987 | Fujiwara et al. ............ 361/502 |
| 4,737,889 | 4/1988 | Nishino et al. ............. 361/502 |

FOREIGN PATENT DOCUMENTS 63-187613  8/1988  Japan .

Primary Examiner—Donald A. Griffin
Attorney, Agent, or Firm—Ostrolenk, Faber, Gerb & Soffen

[57] ABSTRACT

A stacked electric double layer capacitor including a peripheral portion of an intermediate electrode plate held between peripheral portions of first and second case halves to be welded to each other, thereby defining first and second closed spaces for storing first and second capacitor elements, respectively. The first and second electrode plates are exposed by openings provided in the first and second case halves to form external terminal means, respectively. The two capacitor elements, stacked in series with each other are stored in the case, formed by joining the case halves to form a stacked electric double layer capacitor which can be reduced in thickness with substantially no leakage of electrolyte.

9 Claims, 3 Drawing Sheets

STACKED ELECTRIC DOUBLE LAYER CAPACITOR

BACKGROUND OF THE INVENTION

1. Field of the Invention

The present invention relates to a stacked electric double layer capacitor comprising a plurality of capacitor elements which are stacked in series with each other. More particularly, the present invention relates to a structure for storing capacitor elements in a stacked electric double layer capacitor.

2. Description of the Background Art

Due to recent development of semiconductor techniques, not only industrial apparatuses but consumer apparatuses generally have CPUs on board. These apparatuses are usually provided with a RAM for storing programs and data. It is therefore necessary to regularly apply a voltage of at least about 2 V to the RAM, in order to hold the memory.

Such a voltage for memory protection can be supplied by a battery or an electric double layer capacitor. The electric double layer capacitor is mainly employed as a backup power source in recent years in consideration of excellent maintainability, facility, degree of freedom in design, and the like.

A semiconductor device such as a CPU or a RAM is increasingly reduced in operating voltage, so that the device can be advantageously applied to a portable apparatus. To this end, there is a need for miniaturization and reduction in thickness of the electric double layer capacitor used as the backup power source.

Such an electric double layer capacitor indispensably requires an electrolyte, which is generally prepared from a nonaqueous solvent type organic electrolyte or an aqueous electrolyte. The difference between these electrolytes resides in decomposition voltages, so that organic electrolyte is generally suitable for miniaturizing and reducing the thickness of the capacitor made using it since the organic electrolyte can easily attain a higher voltage per unit cell as compared with the aqueous electrolyte.

FIG. 6 shows a general unit structure of a conventional electric double layer capacitor 1 employing an organic electrolyte. Referring to FIG. 6, the electric double layer capacitor 1 comprises polarizable electrodes 2 and 3, made of a carbonaceous material such as activated carbon, which are opposed to each other through a separator 4 to form an element 5. Such an element 5 is impregnated with an electrolyte and held between first and second case halves 6 and 7, to be stored in a case defined by the case halves 6 and 7. The first and second case halves 6 and 7, which also serve as external terminal means, are electrically insulated from each other by an insulating gasket 8.

The unit cell of such an electric double layer capacitor 1 employing an organic electrolyte exhibits a withstand voltage of about 1.8 to 2.8 V.

In conformity to the required rated voltage, therefore, a required number of such unit cells are connected in series with each other. In general, a plurality of such electric double layer capacitors 1, as shown in FIG. 6, are stacked to be integrated with each other, in order to attain such series connection of the unit cells. Under the present circumstances, the voltage of an ordinary semiconductor device is 5 V. In general, therefore, two such electric double layer capacitors 1 are stacked to be set at a rated voltage of 5.5 V.

On the other hand, Japanese Patent Laid Open Application 63-187613 (1988) discloses an integrated two-cell stacked electric double layer capacitor which comprises a single metal armoring case and two pairs of capacitance generators stored therein in a series-connected state.

FIG. 7 shows an example of an electric double layer capacitor 9 proposed in the above literature. Referring to FIG. 7, the electric double layer capacitor 9 comprises capacitor elements 10 and 11 which are impregnated with an electrolyte. The capacitor element 10 includes polarizable electrodes 13 and 14 which are opposed to each other through a separator 12, while the other capacitor element 11 includes polarizable electrodes 16 and 17 which are opposed to each other through another separator 15. The capacitor element 10 is held between a first electrode plate 18, which serves both as external terminal means and an armoring case, and a second electrode plate 19. The second electrode plate 19 is arranged between the capacitor elements 10 and 11. The capacitor element 11 is held between the second electrode plate 19 and a third electrode plate 20, the third electrode plate 20 serving both as an external terminal means and an armoring case. Respective peripheral portions 21, 22 and 23 of the first, second and third electrode plates 18, 19 and 20 are electrically insulated from and integrated with each other by insulating gaskets 24 and 25.

According to the structure shown in FIG. 7, it is possible to manufacture an integrated two-cell stacked electric double layer capacitor 9 corresponding to a rated voltage of 5.5 V, through about the same number of steps as those for assembling the electric double layer capacitor 1 defining the unit cell shown in FIG. 6.

With recent miniaturization and reduction in thickness of electronic apparatus, also desired are miniaturization and reduction in thickness of a backup power source provided in the electrode apparatus. In particular, it is desirable that the thickness of such a backup power source be not more than the armoring height of a general semiconductor device.

In the structure shown in FIG. 6, it is possible to somewhat reduce the thickness of the electric double layer capacitor 1 by reducing the insulating gasket 8 in thickness. However, the electric double layer capacitor 1 cannot be sufficiently reduced in thickness since it is impossible to excessively reduce the thickness of the insulating gasket 8 in consideration of sealability and strength of the device. Reduction in thickness of the device is restricted also since it is necessary to stack two or more electric double layer capacitors 1 in order to conform the same to the general rated voltage of 5.5 V.

In the structure shown in FIG. 7, on the other hand, the two capacitor elements 10 and 11 are previously stacked and integrated with each other. However, it is difficult to reduce the thickness of this structure since the insulating gaskets 24 and 25 are employed as sealing means similar to the structure shown in FIG. 6. Moreover, the sealing structure in FIG. 7 is more complicated as compared with that shown in FIG. 6.

In the structures shown in FIGS. 6 and 7, the insulating gaskets 8, 24 and 25 are made of resin, and are held between the upper and lower case peripheral portions under pressure to attain sealing. Thus, the electrolytes may tend to leak due to stress relaxation of the resin, or in similar conditions.

SUMMARY OF THE INVENTION

An object of the present invention is to provide a stacked electric double layer capacitor having a two-cell stacked integrated structure, which can be reduced in thickness with substantially no leakage of an electrolyte.

The present invention is directed to a stacked electric double layer capacitor comprising first and second capacitor elements, each comprising a separator and a pair of polarizable electrodes. The polarizable electrodes are being opposed to each other through the separator. The capacitor elements are stacked in series with each other.

In order to solve the aforementioned technical problems, the inventive stacked electric double layer capacitor comprises a first case half, the inner surface of which is closely associated through an insulating layer with a first electrode plate. The first electrode plate is in contact with the upper surface of the first capacitor element which is located in an upper position in the stacked double layer capacitor. A second case half the inner surface of which is also closely associated through another insulating layer, with a second electrode plate. The second electrode plate is in contact with the lower surface of the second capacitor element which is located in a lower position in the stacked double layer capacitor. An intermediate electrode plate which is arranged between the first and second capacitor elements to be in contact with the lower surface of the first capacitor element and the upper surface of the second capacitor element, respectively. The respective peripheral portions of the first and second case halves are welded so that the first and second case halves and the intermediate electrode define closed spaces for storing the first and second capacitor elements, respectively. Further, the first and second case halves are provided with openings for partially exposing the first and second electrode plates respectively.

As to the aforementioned welding of the peripheral portions of the first and second case halves, the peripheral portion of the intermediate electrode plate may be closely held between the peripheral portions of the first and second case halves to be welded. In another embodiment, the peripheral portions of the first and second case halves may be welded to each other. In this case, the peripheral portion of the intermediate electrode plate may be held under pressure by the peripheral portion of the first and second case halves which are welded to each other. In yet another embodiment, the peripheral portion of the intermediate electrode plate may be fixed to the peripheral portions of the first and second case halves through bonding layers, respectively. Alternatively, the peripheral portions of the first and second case halves may be welded to each other without interposing the intermediate electrode plate.

The first and second case halves, the intermediate electrode plate and the first and second electrode plates are preferably prepared from metal foil members of stainless steel, aluminum, an aluminum alloy or the like, while the insulating layers are preferably formed by thermobonding films.

An electrolyte employable in the present invention is not restricted to an organic type. For example, aqueous solution of potassium hydroxide, may be employed as the electrolyte.

According to the present invention, the first and second electrode plates serve as external terminal means, respectively. In order to enable this, the first and second case halves are provided with openings for partially exposing the first and second electrode plates, respectively.

Therefore, according to the present invention, therefore, the first and second case halves do not serve as external terminal means, whereby it is possible to provide a sealed structure by welding together the peripheral portions of the first and second case halves.

Thus, the thickness of the stacked electric double layer capacitor depends on the thicknesses of the first and second case halves and the intermediate electrode, which are made of metal materials. It is therefore possible to extremely reduce the stacked electric double layer capacitor in thickness by reducing the thicknesses of the metal materials.

As hereinabove described, the sealed structure is enabled by welding, while the insulating layers are located between the first and second case halves and the first and second electrode plates, respectively. Thus, is possible to suppress leakage of the electrolyte, which is often caused by stress relaxation if resin gaskets are employed as already discussed above.

The foregoing and other objects, features, aspects and advantages of the present invention will become more apparent from the following detailed description when taken in conjunction with the accompanying drawings.

DESCRIPTION OF THE PREFERRED EMBODIMENTS

Figure 1:
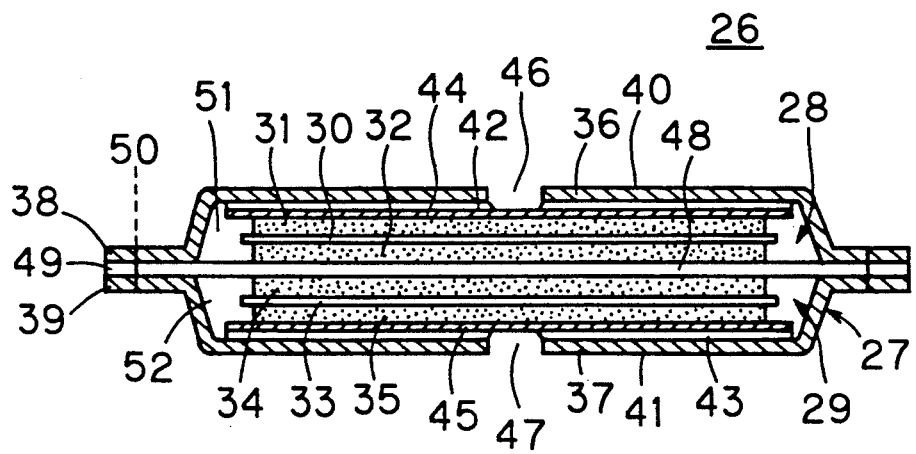
FIG. 1 is a sectional view showing a stacked electric double layer capacitor 26 according to a first embodiment of the present invention.

FIG. 1 is a sectional view showing a stacked electric double layer capacitor 26 according to a first embodiment of the present invention.

The stacked electric double layer capacitor 26 comprises a case 27 storing first and second capacitor elements 28 and 29 which are stacked in series with each other. The first capacitor element 28 comprises a separator 30 and a pair of polarizable electrodes 31 and 32 being opposite to each other through the separator 30. The electrodes 31 and 32 and the separator 30 are impregnated with an electrolyte. The second capacitor element 29 also comprises a separator 33 and a pair of polarizable electrodes 34 and 35.

The case 27 comprises first and second case halves 40 and 41, which have main plane portions 36 and 37 and peripheral portions 38 and 39, respectively. First and second electrode plates 44 and 45, which serve as external terminal means, are closely arranged on respective inner surfaces of the first and second case halves 40 and 41, through, respective insulating layers 42 and 43. The insulating layers 42 and 43 may be of resin, or the like. The insulating layers 42 and 43 are preferably formed by thermobonding films, which are excellent in terms of small thickness, flatness and capability of easily obtaining layers having no pinholes. The first and second case halves 40 and 41 are provided with openings 46 and 47 for partially exposing the first and second electrode plates 44 and 45, respectively.

The first electrode plate 44 is in contact with the upper surface of the first capacitor element 28, which is located in an upper position, while the second electrode plate 45 is in contact with the lower surface of the second capacitor element 29, which is located in a lower portion, to attain the respective electrical connection. An intermediate electrode plate 48 is arranged between the first and second capacitor elements 28 and 29, to be in contact with the lower surface of the first capacitor element 28 and the upper surface of the second capacitor element 29. This intermediate electrode plate 48 has a peripheral portion 49.

The first and second case halves 40 and 41, the first and second electrode plates 44 and 45 and the intermediate electrode plate 48 are advantageously formed by metal foil members prepared from stainless steel, aluminum or an aluminum alloy, in consideration of their excellent corrosion resistance and capability of reduction in thickness.

The peripheral portions 38 and 39 of the first and second case halves 40 and 41 are opposed to each other through the peripheral portion 49 of the intermediate electrode plate 48. In this state, the peripheral portions 38, 39 and 49 are subjected to, for example, resistance seam welding to form a weld zone 50. Thus, the case 27 is sealed while a first closed space 51 is defined by the first case half 40 and the intermediate electrode plate 48, and a second closed space 52 is defined by the second case half 41 and the intermediate electrode plate 48. The first and second capacitor elements 28 and 29 are stored in the first and second closed spaces 51 and 52, respectively.

Exemplary steps of assembling the stacked electric double layer capacitor 26 shown in FIG. 1 are now described.

A thermobonding film, for defining the insulating layer 42, and the first electrode plate 44 are superposed on the inner surface of the first case half 40 and heated under pressure, to be in close contact with or fixed to each other. At this time, the thermobonding film is previously provided with an opening in a portion corresponding to the opening 46, for partially exposing the first electrode plate 44 at the opening 46. In a similar manner, the second electrode plate 45 is brought into close contact with or fixed to the inner surface of the second case half 41, through a thermobonding film which defines the insulating layer 43.

On the other hand, the first and second capacitor elements 28 and 29 are, respectively, obtained by integrally bonding the polarizable electrodes 31, 32, 34 and 35 of activated carbon sheets onto both surfaces of the separators 30 and 33 by a bonding or adhesive agent, and impregnating the polarizable electrodes 31, 32, 34 and 35 and the separators 30 and 33 with an electrolyte.

Then, the second capacitor element 29, the intermediate electrode plate 48, the first capacitor element 28 and the first case half 40 are successively superposed on the second case half 41. The peripheral portions 38, 39 and 49 of the first and second case halves 40 and 41 and the intermediate electrode plate 48, respectively, are welded to form the weld zone 50, thereby supplying the case 27 with a sealed structure.

Figure 2:
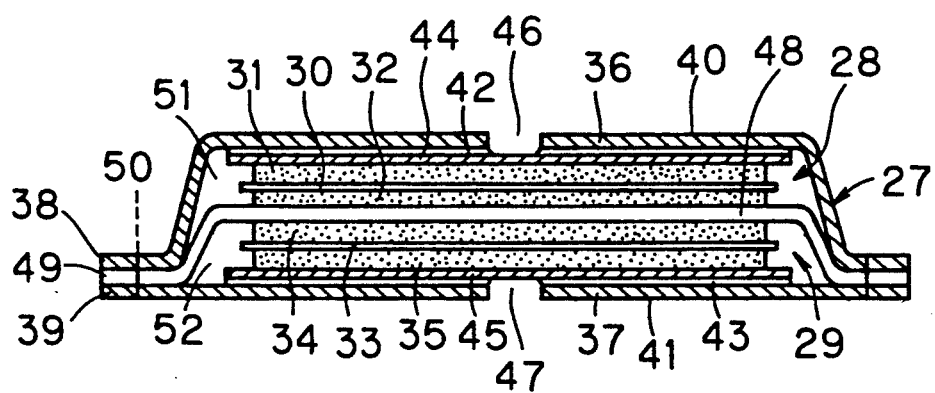
FIG. 2 is a sectional view showing a stacked electric double layer capacitor 26a according to a second embodiment of the present invention.

FIG. 2 shows a stacked electric double layer capacitor 26a according to a second embodiment of the present invention. This stacked electric double layer capacitor 26a comprises all elements included in the electric double layer capacitor 26 shown in FIG. 1. Therefore, common elements are denoted by similar reference numerals.

Shown in FIG. 2 are the shapes of first and second case halves 40 and 41 and an intermediate electrode plate 48 of the stacked electric double layer capacitor 26a. While in the first embodiment the peripheral portions 38 and 39 of the first and second case halves 40 and 41 are superposed on the upper and lower surfaces of the peripheral portion 49 of the intermediate electrode plate 48 in the second embodiment peripheral portions 49 and 38 of the intermediate electrode plate 48 and the first case half 40, respectively, are successively superposed on a peripheral portion 39 of a flat second case half 41. A weld zone 50 is formed through the peripheral portions 38, 39 and 49 which are superposed in the manner described above.

In the first embodiment, the first and second case halves 40 and 41 are of the same shape and can be prepared from common parts to advantageously reduce the number of parts in manufacturing. In contrast, the electric double layer capacitor 26a according to the second embodiment can be easily subjected to electric resistance welding or the like, since the second case half 41 has a flat shape.

Figure 3:
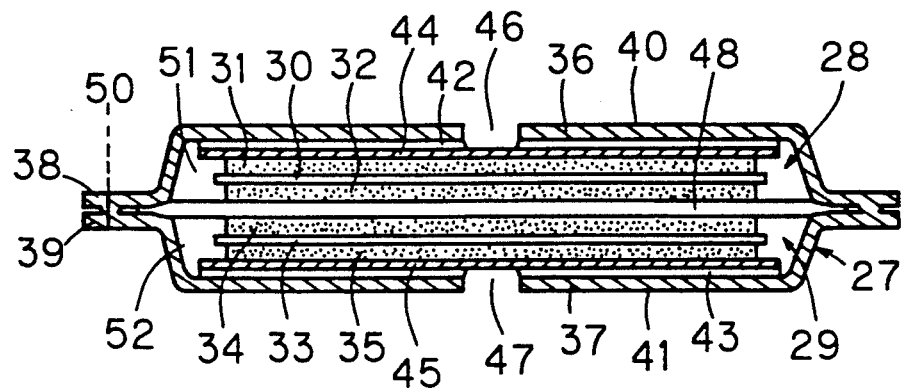
FIG. 3 is a sectional view showing a stacked electric double layer capacitor 26b according to a third embodiment of the present invention.
Figure 4:
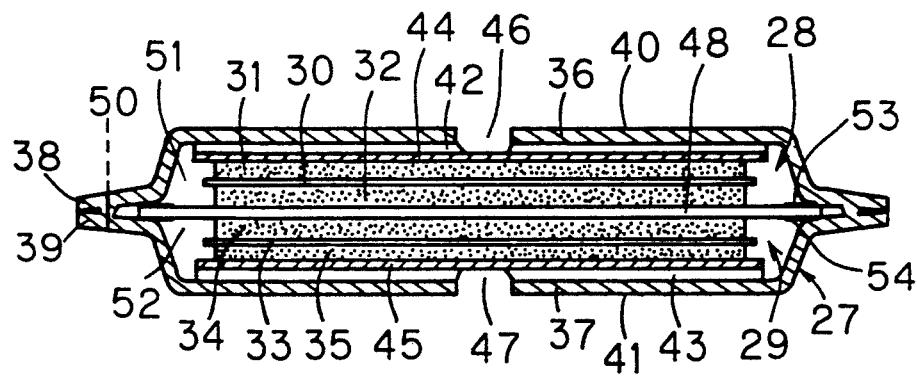
FIG. 4 is a sectional view showing a stacked electric double layer capacitor 26c according to a fourth embodiment of the present invention.
Figure 5:
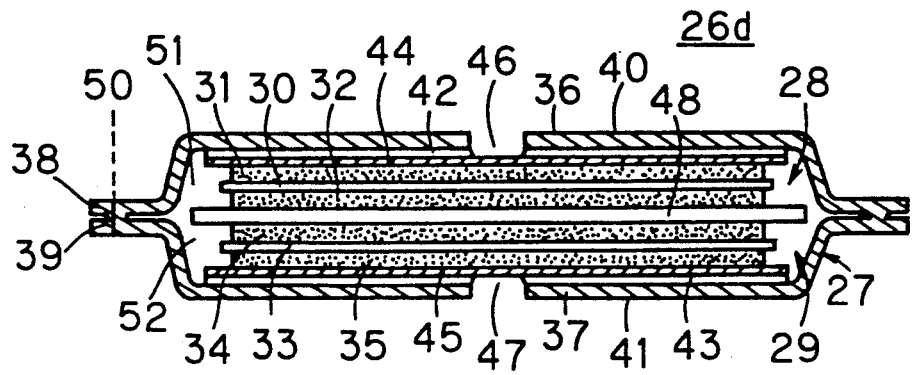
FIG. 5 is a sectional view showing a stacked electric double layer capacitor 26d according to a fifth embodiment of the present invention.
Figure 6:
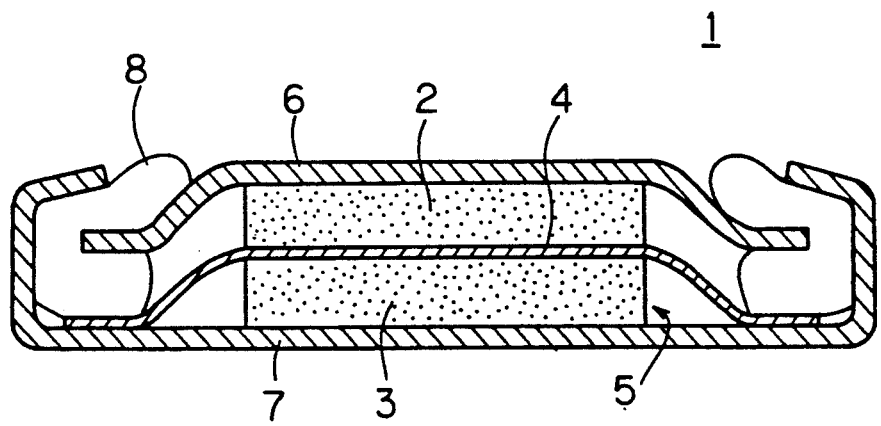
FIG. 6 is a sectional view showing a conventional electric double layer capacitor 1 having the most basic structure.
Figure 7:
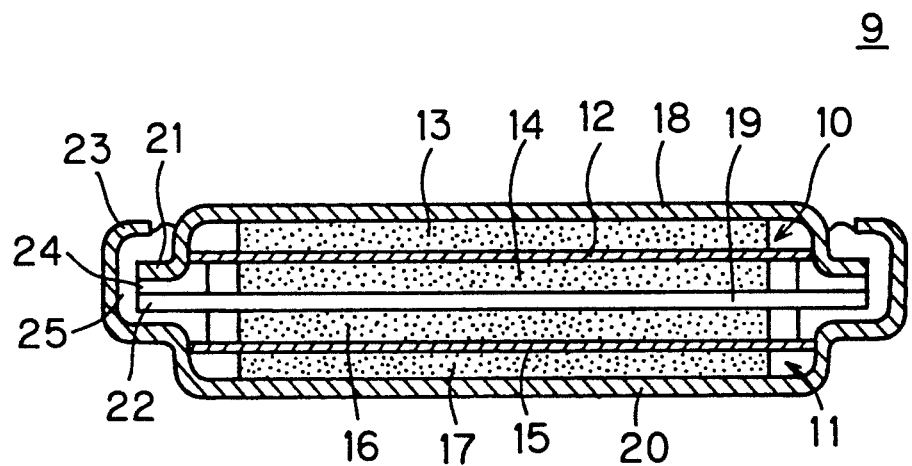
FIG. 7 is a sectional view showing a conventional two-cell integrated type electric double layer capacitor 9.

FIGS. 3 to 5 illustrate stacked electric double layer capacitors 26b to 26d according to third to fifth embodiments of the present invention, respectively. These stacked electric double layer capacitors 26b to 26d also comprise all elements included in the electric double layer capacitor 26 shown in FIG. 1. Therefore, common elements are denoted by similar reference numerals.

In the stacked electric double layer capacitor 26b shown in FIG. 3, a weld zone 50 is formed by welding peripheral portions 38 and 39 of first and second case halves 40 and 41 with each other. A peripheral portion 49 of an intermediate electrode plate 48 is held under pressure between the peripheral portions 38 and 39 of the first and second case halves 40 and 41 which are welded in the aforementioned manner.

In the third embodiment, the peripheral portion 38, for example, is preferably provided, on a surface facing the peripheral portion 39, with a projection which continuously extends along the overall periphery, so that the peripheral portions 38 and 39 can be welded to each other by projection welding. In order to improve sealability attained by holding the intermediate electrode plate 48 between the peripheral portions 38 and 39 under pressure, the intermediate electrode plate 48 is preferably formed by a metal foil member which is prepared from aluminum or an aluminum alloy having excellent malleability.

In the stacked electric double layer capacitor 26c shown in FIG. 4, peripheral portions 38 and 39 of first and second case halves 40 and 41 are welded to each other, similar to the stacked electric double layer capacitor 26b shown in FIG. 3. Particularly in the stacked electric double layer capacitor 26c shown in FIG. 4, a peripheral portion 49 of an intermediate electrode plate 48 is airtightly fixed to the peripheral portions 38 and 39 of the first and second case halves 40 and 41 by bonding layers 53 and 54 respectively. Such bonding layers 53 and 54 are preferably prepared from thermobonding films in consideration of thicknesses and workability, and the bonding states are attained, for example, by hot pressing.

In the stacked electric double layer capacitor 26d shown in FIG. 5, peripheral portions 38 and 39 of first and second case halves 40 and 41 are welded to each other, in a manner similar to the stacked electric double layer capacitor 26c shown in FIG. 3. Particularly in the stacked electric double layer capacitor 26d shown in FIG. 5, the peripheral portions 38 and 39 of the first and second case halves 40 and 41 are welded and fixed to each other without interposing a peripheral portion 49 of an intermediate electrode plate 48. In this case, the intermediate electrode 48 is preferably fixed to the lower surface of a first capacitor element 28 and the upper surface of a second capacitor element 29 by a bonding or adhesive agent, to be prevented from misregistration.

Although the present invention has been described and illustrated in detail, it is clearly understood that the same is by way of illustration and example only and is not to be taken by way of limitation, the scope of the present invention being limited only by the terms of the appended claims.

What is claimed is:

1. A stacked electric double layer capacitor having first and second capacitor elements stacked in series, the stacked double layer capacitor comprising:
    a case; the case having a first case half and a second case half, each case half having a peripheral portion, said respective peripheral portions being joined as to form a sealed closed space bounded by said first and second case halves;
    first and second electrode plates, each electrode plate being closely associated with an inside surface of a respective one of said case halves, an insulating layer being provided between each said case half and its respective electrode plate, and said case halves having respective openings which partially expose said first and said second electrode plates, respectively;
    first and second capacitor elements stacked inside said closed space so that said first capacitor element is on top of said second capacitor element; a top surface of said first capacitor element being in contact with said first electrode plate and a bottom surface of said second capacitor element being in contact with said second electrode plate; each capacitor element having a separator and a pair of polarizable electrodes opposed to each other through said separator, said separator and said polarizable electrodes being impregnated with an electrolyte; and
    an intermediate electrode plate between said first and said second capacitor elements, said intermediate plate being in contact with a bottom surface of said first capacitor element and with an upper surface of said second capacitor element.

2. A stacked electric double layer capacitor in accordance with claim 1, wherein a peripheral portion of said intermediate electrode plate is located between said peripheral portions of said first case half and said second case half, said peripheral portions of said first case half, said second case half and said intermediate electrode plate being welded to each other.

3. A stacked electric double layer capacitor in accordance with claim 1, wherein said peripheral portion of said first case half and said peripheral portion of said second case half are directly welded to each other.

4. A stacked electric double layer capacitor in accordance with claim 3, wherein a peripheral portion of said intermediate electrode plate is held between said peripheral portions of said first and second case halves.

5. A stacked electric double layer capacitor in accordance with claim 3, wherein a peripheral portion of said intermediate electrode plate is fixed by bonding to said peripheral portions of said first and second case halves.

6. A stacked electric double layer capacitor in accordance with claim 3, wherein said intermediate electrode plate is bonded to the lower surface of said first capacitor element and the upper surface of said second capacitor element.

7. A stacked electric double layer capacitor in accordance with claim 1, wherein said first and second case halves, said intermediate electrode plate and said first and second electrode plates are all formed by metal foil members, said metal foil members being made of an element selected from the group consisting of stainless steel, aluminum and an aluminum alloy.

8. A stacked electric double layer capacitor in accordance with claim 1, wherein said insulating layers include thermobonding films.

9. A stacked electric double layer capacitor in accordance with claim 1, further comprising a peripheral weld zone, said weld zone being formed by welding said peripheral portions of said first and said second case halves.

* * * * *